United States Patent Office 3,293,127
Patented Dec. 20, 1966

3,293,127
ARTERIAL EMBALMING FLUID AND METHOD
FOR EMBALMING THEREWITH
John B. Beck, Wilmington, Del., assignor to Gold Crest
Chemical Corporation Inc., Mendenhall, Pa., a corporation of Pennsylvania
No Drawing. Filed July 22, 1964, Ser. No. 384,512
6 Claims. (Cl. 167—49.5)

The present invention relates to fluids useful in the arterial embalming process.

Arterial embalming is the process of injecting an embalming fluid into a cadaver or dead body through the arterial system and simultaneously draining off the vascular fluids of the body from the venous system. The embalming fluid is injected into an artery under pressure. It pushes the vascular fluids, blood, lymph, etc., ahead of it into the venous side of the circulatory system and out of the body at a drainage point selected by the embalmer. The drainage point is usually the vein corresponding to the artery injected. For instance, if injection is made into the carotid artery, drainage would be from the jugular vein. If the axillary artery is used, drainage is from the axillary vein. When distribution is completed the embalming fluid appears in the drainage. The arterial embalming process is contrasted with cavity embalming which involves the use of highly concentrated chemicals injected directly into body cavities. A cavity embalming mixture is a highly concentrated one usually very high in formaldehyde content which is injected by trocar full strength directly into the visceral area and the thoracic cavities.

Arterial embalming fluids are commercially prepared as concentrates which can be diluted with a suitable liquid such as water for use in arterial embalming. The degree of dilution can be as high as 45 times or more.

Preservation through arterial embalming depends largely upon a thorough distribution of arterial embalming fluid solution throughout the circulatory system. From the circulatory system the preservation action penetrates through the body tissues by diffusion. If adequate osmotic vascular diffusion is obtained, including good capillary distribution, very good preservation is provided.

In many cases circulation of an arterial embalming solution is only partially obtained. Such conditions as arteriosclerosis, thrombi, clots, coagulation, embuli and many other conditions bring about blockage and restrict or prevent circulation. The embalmer can generally overcome such poor circulation by injecting arteries from other points.

As shown in "Encyclopedia of Chemical Technology," pages 674–677 (1950), formaldehyde is widely used as an active embalming ingredient in arterial embalming fluids, and is required by law in many places. The use of formaldehyde as a prime preserving chemical has, however, a serious drawback. Formaldehyde is highly astringent, that is, on contact with body tissue formaldehyde causes shrinkage and contraction of the tissue. This shrinkage and contraction greatly hinders osmotic diffusion and penetration of the embalming fluid into body tissues is greatly limited.

The limitation of osmotic penetration where formaldehyde is used has been confirmed many times by post mortems or autopsy after embalming. In external applications to sites of trauma, gangrene, burned tissue and such, and also where organs such as the heart, liver, lungs or kidneys have been immersed in a formaldehyde solution for 8 to 12 hours, there is some tissue penetration but rarely exceeding ¼ to ½ inch in depth, and in some cases no measurable depth is achieved. This is particularly true where a strong formaldehyde solution was used. The stronger the solution the greater the astringency.

It is an object of this invention to produce novel arterial embalming fluids. It is a further object to provide such arterial embalming fluids which use formaldehyde as a prime preserving chemical and provide rapid and deep osmotic action. It is further an object to provide fluids whose penetrating and diffusing action is continuous and sustained over long periods of time.

It has been discovered that arterial embalming fluids that contain formaldehyde as a prime preservative can be vastly improved as to their diffusing properties when they also contain relatively small amounts of a substantially neutralized polyacrylic acid. It has further been found that paradichlorobenzene and/or orthodichlorobenzene in embalming fluids and solutions containing formaldehyde as a prime preservative provide an unusual degree of penetration and outstanding preservation.

Substantially neutralized polyacrylic acid having a pH of from about 5.5 to 8, and preferably 6, seems to counteract the astringency of the formaldehyde and sharply increases penetration into body tissues from the circulatory system. This action is continuous and lasts for hours after injection into the arterial system is completed.

Substantially neutralized polyacrylic acid also diffuses through the tissues and has a pronounced effect in retarding dehydration or desiccation. As a result the embalmed body can be stored for fairly long periods of time without visible deterioration of appearance.

Paradichlorobenzene and orthodichlorobenzene both have relatively high vapor pressure, and used separately or in combination in the formaldehyde-containing fluid also penetrate through the walls of the circulatory system and into the tissues even faster than the liquid diffuses, apparently because of gaseous diffusion through the walls of the circulatory system and tissue cells. This action appears to be separate and independent of the liquid diffusion, and provides rapid and deep disinfecting, deodorizing, and germicidal action even without the presence of the substantially neutralized polyacrylic acid.

When the substantially neutralized polyacrylic acid is combined with paradichlorobenzene and orthodichlorobenzene in such formaldehyde-containing fluids, there is obtained exceptionally deep liquid and gas penetration with resulting outstanding preservation. The penetration continues long after injection pressures have subsided and radiates from all blood vessels in every direction. Diffusion is most thorough in normal cases and greatly enhanced in abnormal circulatory conditions (e.g. circulatory hindrances).

Where circulatory blockage is severe the arterial injection of the fluid of the present invention can be preceded by the arterial injection of an embalming fluid having a large content of sodium nitrate, or sodium oxalate or other blood anti-coagulants, and preferably distinctly alkaline, that is with a pH of about 8.5. Examples of such pre-treating fluids are the fluids described in the aforementioned 1950 edition of "Encyclopedia of Chemical Technology," pages 674–677.

Instead of injecting the pre-treating fluid alone, it can be mixed with a fluid of the present invention for use as a preliminary injection. In either event, the pre-treatment is followed by an injection of a fluid of the present invention alone. Mixtures of equal parts of such fluids are very effective as a preliminary injection material, although such mixtures are not too compatible and ingredients held in suspension in either tend to flocculate out when such mixtures stand for several hours.

The term polyacrylic acid refers to homopolymers of acrylic acid having recurring units

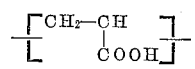

The degree of polymerization may in general be such that the molecular weight of the polymer ranges from 1000 to 150,000 with a preferred range of 10,000 to 30,000.

These materials are commercially available both as powders and concentrated solutions in water, neutralized as well as unneutralized. Any such material can be used. A suitable polyacrylic acid for this invention is "Carbopol 934" which is a white, free-flowing powder; bulk density, 13 lb./cu. ft.; pH of 1% water solution, 3. It is available from Goodrich Chemical Co., and disperses readily in water to yield acid solutions. Another suitable material is Acrysol HV-1 which is available from Rohm and Haas and is an aqueous solution of polyacrylic acid neutralized with NaOH.

The neutralizing of the polyacrylic acid may be accomplished in situ in the embalming fluid by separately adding polyacrylic acid and a suitable base to the embalming mixture. Alternatively, the polyacrylic acid may be neutralized prior to its addition to the fluid. Any alkali metal hydroxide, triethanolamine and even ammonia can be used as the neutralizing base.

The foregoing effects of polyacrylic acid are obtained with fluids having from about 0.005 to 0.5% of this acid by weight, preferably 0.1 to 0.5%, calculated on the basis of the unneutralized material. Paradichlorobenzene and orthodichlorobenzene are best used in concentrations about ten times the foregoing amounts, although the paradichlorobenzene can be as little as five times the foregoing concentrations. Orthodichlorobenzene is preferably in concentrations of from about 1 to 4% by weight, and paradichlorobenzene preferably in concentrations of from 1 to 2% by weight. Emulsifiers such as mineral oil sulfonates or alkyl benzene polyethoxyethanols or even quaternized alkyl benzyl amines are helpful in dispersing the dichlorobenzenes in the fluid. A substantial content of methanol, generally from about 5 to 30% by weight also helps in the dispersing action. Both the dispersing agents and the methanol also assist in diffusing the fluid through the tissues.

A particularly effective formulation for the embalming fluid of the present invention is:

*Example I*

| Constituents: | Amount used |
|---|---|
| Glycerine | lbs 20 |
| Carbopol 934 | lbs 4 |
| Atlantic Soluble Oil No. 1 (sulphonated naphthenic mineral oil) | lbs 25 |
| Formaldehyde (46% solution in MeOH) | lbs 516 |
| Paradichlorobenzene | lbs 20 |
| Orthodichlorobenzene | lbs 42 |
| Pine oil | lbs 20 |
| Rhodomine B dye (2% solution in water) | cc 2000 |
| Bismark brown (3% solution in water) | cc 2500 |
| Sodium hydroxide (crystals) | oz 38 |
| Water | lbs 528 |
| Methanol | lbs 53 |

In the above formulation the sodium hydroxide was added in an amount sufficient to neutralize the polyacrylic acid (Carbopol 934) and to give the final formulation a pH of about 6. In lieu of the Carbopol 934 and the sodium hydroxide, Acrysol HV-1 (neutralized aqueous solution of polyacrylic acid) may be utilized in an amount, for example, of 20 lbs.

The glycerine in the foregoing example further assists in the diffusion through tissues, when used in an amount from about ½ to about 5% by weight. The pine oil contributes some additional germicidal action and also improves the odor of the fluid as well as of the body. It can likewise be used in concentrations of from about ½ to about 5% by weight. The two dyes help provide an internal stain in the body that improves its cosmetic appearance. Any or all of these supplemental ingredients can be omitted, however, without detracting too much from the efficiency of the fluid.

For use the fluid of Example I is best diluted with from about 4 to about 45 times its volume of water and the resulting mixture injected into one or more arteries as indicated above. The fluid of the present invention can also be injected arterially in undiluted form or applied directly to the body surface as by injection directly into body cavities, in which case it is preferable to use it full strength. It is particularly valuable for such use when applied to badly decomposed corpses.

Other examples of fluids that are highly effective although not quite as effective as the fluid of Example I are as follows:

*Example II*

| Constituents: | Amount used |
|---|---|
| Propylene glycol | lbs 25 |
| Sodium polyacrylate (molecular weight approximately 30,000) | lbs 18 |
| Formaldehyde (46% solution in methanol) | lbs 420 |
| Paradichlorobenzene | lbs 24 |
| Pine oil | lbs 32 |
| Eosin dye (1% solution in water) | cc 2400 |
| Water | lbs 470 |
| Methanol | lbs 235 |

*Example III*

| Constituents: | Amount used, lbs. |
|---|---|
| Glycerine | 28 |
| Formaldehyde (37% solution in water) | 950 |
| Orthodichlorobenzene | 36 |
| Pine oil | 30 |
| Monolauric ester of sorbitan hexa-ethoxy ethanol (such as "Tween 20" or "Span 20") | 18 |
| Methanol | 220 |

*Example IV*

| Constitutents: | Amount used |
|---|---|
| Water | lbs 520 |
| Borax | lbs 46 |
| Sodium sulphate | lbs 36 |
| Sodium citrate | lbs 64 |
| Glycerine | lbs 60 |
| Carbopol 934 | lbs 5½ |
| Formaldehyde (46% solution in methanol) | lbs 524 |
| Phenol | lbs 48 |
| Sodium hydroxide crystals (to adjust pH to 7.6) | lbs 2½ |
| Eosin OJ (1% solution in water) | cc 2400 |

The fluids of the present invention can also contain supplemental ingredients such as other blood anti-coagulants, and other preservatives such as glyoxal and glutaraldehyde, although these are not really needed.

Obviously many modifications and variations of the present invention are possible in the light of the above teachings. It is, therefore, to be understood that within the scope of the appended claims the invention may be practiced otherwise than as specifically claimed.

What is claimed:

1. In the process of embalming a body by introducing into it an embalming fluid containing formaldehyde in a concentration sufficient to make it an effective embalming agent, the improvement according to which such embalming fluid also contains 0.005 to 0.5% by weight of substantially neutralized polyacrylic acid.

2. An arterial embalming fluid containing formaldehyde as an effective embalming agent, said fluid also containing a compound selected from the class consisting of paradichlorobenzene and orthodichlorobenzene in a concentration of from about 0.025 to about 5% by weight, 3. An arterial embalming fluid containing formaldehyde as an effective embalming agent, and also containing about 0.005 to 0.5% by weight substantially neutralized polyacrylic acid, about 0.025 to 2.5% by weight paradichlorobenzene and about 0.05 to 5% by weight orthodichlorobenzene.

4. An arterial embalming fluid concentrate containing in percent by weight

| Constituents: | Weight percent |
|---|---|
| Formaldehyde | 10 to 30 |
| Substantially neutralized polyacrylic acid | 0.1 to 0.5 |
| Paradichlorobenzene | 1 to 2 |
| Orthodichlorobenzene | 1 to 4 |

5. The arterial embalming fluid concentrate of claim 4, said fluid also containing 5 to 30% methanol.

6. An arterial embalming fluid concentrate according to claim 5 and also containing ½ to 5% glycerine and ½ to 5% pine oil.

References Cited by the Examiner

UNITED STATES PATENTS

| 2,208,764 | 7/1940 | Jones | 167—49.5 |
| 3,138,520 | 6/1964 | Pugh | 167—26 |

OTHER REFERENCES

Mendelsohn: Embalming Fluids, Chemical Publishing Co. (1940), New York, New York, pp. 46–49.

JULIAN S. LEVITT, *Primary Examiner.*

VERA C. CLARKE, *Assistant Examiner.*